July 16, 1968            L. G. SPENCER            3,393,317
RADIOLOGICAL CAMERA COMPRISING A SHIELDED CONTAINER
HAVING A TORTUOUS PASSAGEWAY
Filed April 24, 1964            2 Sheets-Sheet 1

INVENTOR
Leo G. Spencer
BY Edward Eundy Bishop
ATTORNEY

July 16, 1968        L. G. SPENCER        3,393,317
RADIOLOGICAL CAMERA COMPRISING A SHIELDED CONTAINER
HAVING A TORTUOUS PASSAGEWAY
Filed April 24, 1964        2 Sheets-Sheet 2

Leo G. Spencer
INVENTOR

BY

ATTORNEY

United States Patent Office 3,393,317
Patented July 16, 1968

3,393,317
RADIOLOGICAL CAMERA COMPRISING A SHIELDED CONTAINER HAVING A TORTUOUS PASSAGEWAY
Leo G. Spencer, 10838 64th Ave., Edmonton, Alberta, Canada
Filed Apr. 24, 1964, Ser. No. 362,402
1 Claim. (Cl. 250—106)

This invention relates generally to radiological cameras and particularly to the control of radio active sources in such cameras.

Radiological cameras wherein a source emitting gamma rays is contained within a shilded container, are now used widely for checking pipe lines and the like for flaws and other imperfections in the pipe line welds.

In some instances the cameras use a probe that is connected to the shielded container containing the gamma ray source and with mechanism that will drive the gamma ray source from its shielded container into the probe. In others the gamma ray source is contained within a shielded container and there are provided rollers on the container so that the container may be moved along the pipe line. There is then provided some means for moving the source from a safe position within the camera to a position where it may be used for radiographic checking of the pipe.

The means for moving the gamma ray source usually comprises a cylinder that may be rotated within the shielded container. The gamma ray source will be moved as the cylinder is rotated from a position near the centre of the container to a position close to the bottom of the container and in proximity to the pipe line over which the container is travelling. While the rotating cylinder mechanism does function to move the radiological source into position for checking the pipe line, this mechanism is cumbersome and difficult to maintain in continuing satisfactory operation.

In addition, prior devices of this sort have not been entirely satisfactory insofar as shielding of the gamma ray source is concerned. In devices where the shielding has been adequate, weight has been a problem.

Further, considerable mechanical apparatus is required to rotate the cylinder containing the gamma ray source with a consequent increase in the cost of operation and maintenance of the apparatus.

The essence of my invention is the provision of a shielded container with a tortuous passageway in the container curved to pass close to a wall of the container, to provide a radiographic position where rays from the gamma ray source situated at the radiographic position will pass through the wall of the container.

In drawings illustrating a preferred embodiment:

Figure 1:
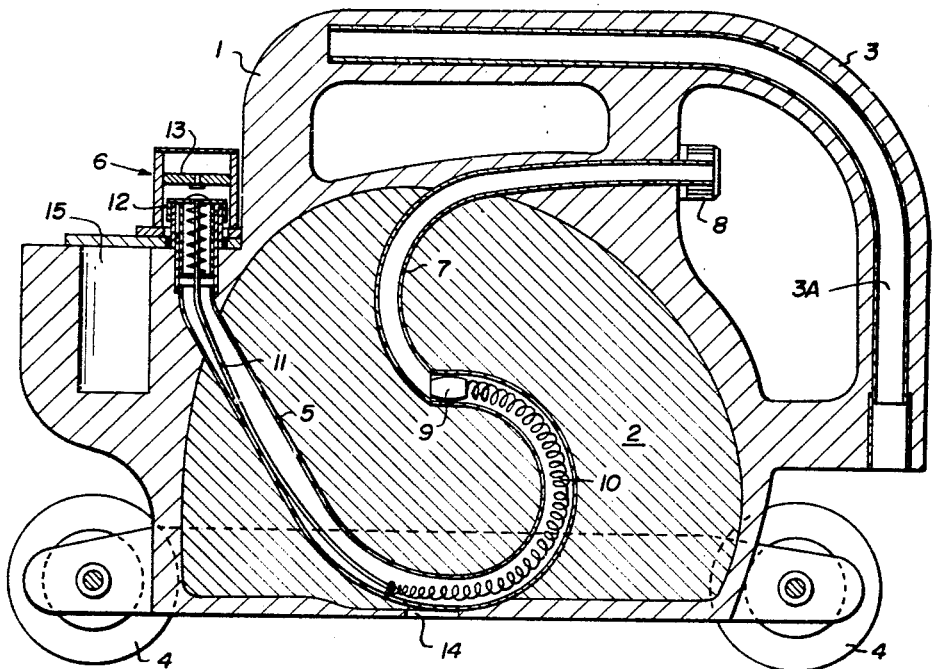
FIGURE 1 is a sectional side elevation with the gamma ray source in the maximum shielding or "safe" position.
Figure 2:
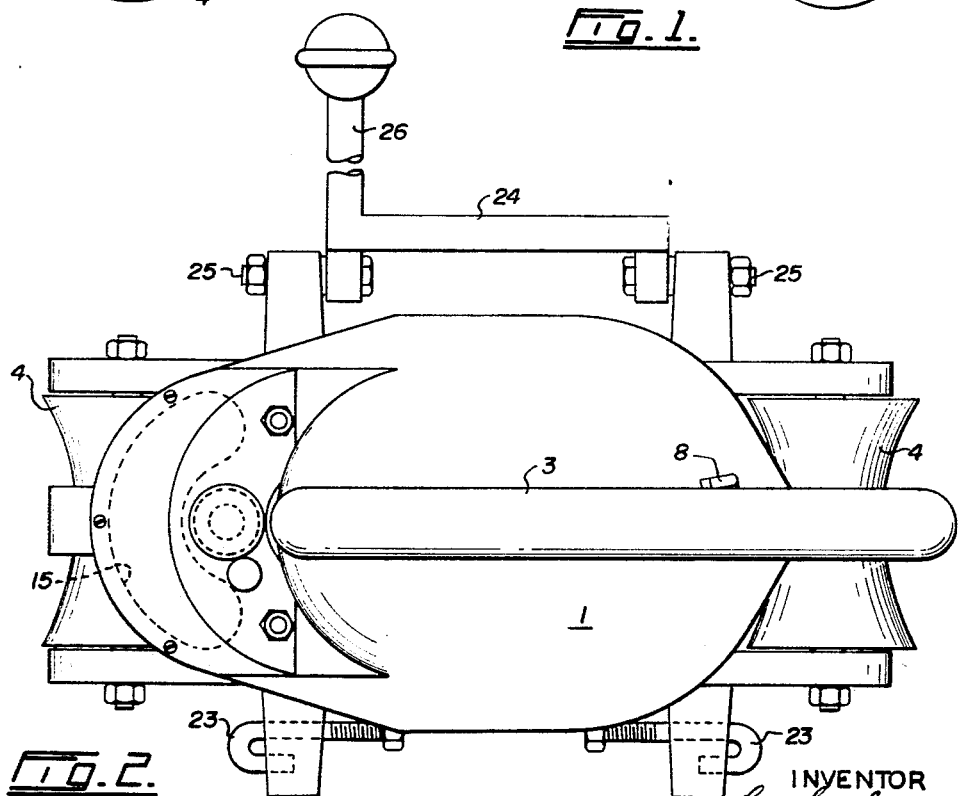
FIGURE 2 is a top plan view.

As seen in the drawings, a container 1 preferably cast from aluminum or similar material is hollowed as indicated at 2. The hollowed portion is filled with lead or some other suitable shielding material. The container 1 is provided with a handle 3 so that the device may be moved and carried and a pair of rubber rollers 4 are mounted for rotation to allow the device to be rolled along a pipe line as required during operation of the camera.

A tortuous passageway is formed through the shielding material in the container. This passageway consists of the portion 5 which extends from the switch mechanism indicated generally at 6 and is curved down in the container to a radiography position 14 adjacent the bottom of the container. It then curves up and inwardly to a point approximately at the centre of the container. From that point a second portion 7 is curved to the rear of the container and projects at the rear of the container to terminate in a threaded attachment 8.

The gamma ray source 9 as seen in FIGURE 1 as positioned at the meeting of the portions 5 and 7 of the passageway and normally is held at this "safe" position by the spring 10. The spring 10 is connected to one end of the flexible rod 11 which is in turn connected at its opposite end to moveable contact 12 of the switch assembly 6. The other contact 13 of the switch assembly is a stationary contact and, as seen in FIGURE 1, with the source 9 in the safe position, the contacts 12 and 13 are separated.

Whenever the gamma ray source 9 is moved away from its safe position at the centre of the shielding and toward the radiography position 14, the spring 10 will be compressed and this will react on the flexible rod 11 to close the contacts 12 and 13. While not shown the contacts 12 and 13 would be wired to control operation of a warning light and/or a warning buzzer which would indicate that the gamma ray source 9 was moved from its safe position. The battery box 15 in the container 1 would contain suitable batteries to provide power for the light or warning buzzer. It is not considered that further description of the warning lights or buzzers need be included since such warning mechanisms are common and their operation and connection is well understood.

Movement of the gamma ray source 9 from the safe position to the radiological position 14 may be accomplished by forcing an actuating cable into the portion 7 of the passageway in the container so that the actuating cable will push against the source 9.

Figure 3:
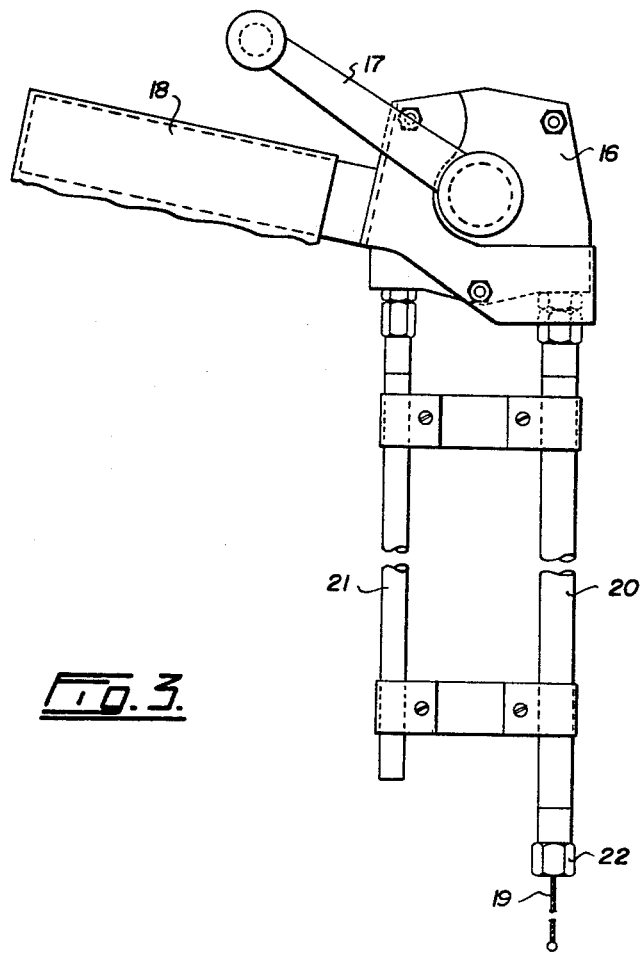
FIGURE 3 is a side elevation of a preferred device for moving the radiological source from its safe position to the radiographic position.

Apparatus for this operation is illustrated in FIGURE 3 in the drawings and comprises a housing 16 with a cable drum in the housing. An actuating handle 17 external to the box may be operated manually to rotate the drum. A handle 18 projects from the gear box 16 and is grasped in one hand of the operator to support the gear box as the handle 17 is actuated.

The cable 19 wound on the drum is preferably about 10 feet in length and projects at its one end through the tube 20 and at its opposite end through the waste tube 21.

The tube 20 is provided with a connector 22 which engages threadedly on the connector 8. When so connected, the handle 17 is actuated and the cable 19 will be driven through the portion 7 of the passageway to contact the source 9. Further rotation of the handle 17 will drive the source 9 against the tension of the spring 10 and move the source 9 to the radiographic position 14.

While no indication has been provided to show when the source 9 has reached the radiographic position 14, an operator can tell easily by the feel of the actuating handle 17 when the spring 10 has been fully compressed. At this point, the source 9 will be at the radiographic position 14.

While I have not considered it necessary to illustrate such construction in the drawings, this camera could be used with a conventional head tube which would be connected to the passageway at the end of the section 5 with the switch 6, the rod 11 and spring 12 removed. Thereafter, an air source connected at 8 could be used to blow the radiological source through the section 5 and out through the head to end of the tube for conventional radiological work. When the source was no longer required suction applied at the connection 8 would then suck the gamma ray source 9 back through the head tube and through the head tube and through the section 5 with the source 9 at the safe position.

The device is moved along a pipeline or other service to be photographed on the rubber rollers 4 and, when the camera is in a position for radiographic work it is secured in position on the pipeline by chains or other means connected at one end to the hooks 23, passed underneath the pipe and then connected to the bar 24 which is pivoted at 25 to the case. The handle 26 then is rotated up against the case to draw the chains tightly around the bottom of the pipe and to secure the camera in the desired position.

In operation and once the camera is secured on the pipe, the connector 22 is connected at 8 and the handle 17 rotated to drive the cable 19 through the passageway 7 into engagement with the radioactive source 9. Further movement of the cable 19 will move the radioactive source against the tension of the spring 10 and when the spring 10 has been compressed fully the radioactive source 9 will be at the position 14. The compression of the spring 10 will exert force on the rod 11 to close the contacts on the switch assembly 6 and to activate whatever warning system is connected to the switch.

The embodiments of the invention in which an exclusive property or privilege is claimed are defined as follows:

1. In a gamma ray camera, a container filled with radio active shielding material and having a flat face with an opening therein defining a radiography position, such container mounted on rollers adapted to support and convey the container over a surface with the said face substantially parallel to the surface, a tortuous passageway through the radio active shielding material in the container, such passageway formed of portions of different diameter joined at substantially the centre of the said shielding material to define a safe position, one portion of the passageway curving and extending from the safe position to the said radiography position and extending from the radiography position to an alarm location on the exterior of the container, the other portion of the passageway curving and extending from the safe position to an attachment point on the exterior of the container remote from the alarm location, a gamma ray source of a size to slide freely in the portion of the pasageway extending to the radiography position and of too large diameter to pass through the other portion of the passageway, an alarm positioned at the alarm location on the exterior of the container and spring means extending from the safe position to the alarm, such spring means acting to normally maintain the gamma ray source at the safe position with the alarm in the off position and to actuate the alarm when the gamma ray source is moved away from the safe position toward the radiographic position, means insertable at the attachment point of the passageway to engage with the gamma ray source and move the gamma ray source from the safe position to the radiographic position.

References Cited

UNITED STATES PATENTS

| | | | |
|---|---|---|---|
| 2,719,926 | 10/1955 | Proctor et al. | 250—108 |
| 2,916,628 | 12/1959 | Prest | 250—106 |
| 3,032,661 | 5/1962 | Wolf | 250—106 |

ARCHIE R. BORCHELT, *Primary Examiner.*